(12) United States Patent
Park et al.

(10) Patent No.: US 10,280,315 B2
(45) Date of Patent: May 7, 2019

(54) ANTI-FOULING SURFACE COATING MATERIALS

(71) Applicant: Hyundai Motor Company, Seoul (KR)

(72) Inventors: Sung June Park, Osan-si (KR); Chang Bum Soun, Seoul (KR)

(73) Assignee: Hyundai Motor Company, Seoul (KR)

( * ) Notice: Subject to any disclaimer, the term of this patent is extended or adjusted under 35 U.S.C. 154(b) by 41 days.

(21) Appl. No.: 15/377,617

(22) Filed: Dec. 13, 2016

(65) Prior Publication Data

US 2017/0298235 A1    Oct. 19, 2017

(30) Foreign Application Priority Data

Apr. 14, 2016   (KR) ................... 10-2016-0045723

(51) Int. Cl.
*C09D 5/16*    (2006.01)

(52) U.S. Cl.
CPC .................. *C09D 5/1693* (2013.01)

(58) Field of Classification Search
CPC .................................................. C09D 5/1693
See application file for complete search history.

(56) References Cited

FOREIGN PATENT DOCUMENTS

| JP | H07-126042 A | 5/1995 | |
| JP | 2000-327818 | 11/2000 | |
| JP | 2000-327818 A | * 11/2000 | |
| JP | 4666667 | 4/2011 | |
| JP | 5761305 | 8/2015 | |
| KR | 10-2004-0087601 | 10/2004 | |
| KR | 2004-0087601 A | * 10/2004 | |
| KR | 10-2008-0008409 | 1/2008 | |
| KR | 10-2014-0035420 A | 3/2014 | |
| KR | 10-2014-0122262 | 10/2014 | |
| KR | 10-2015-0016148 | 2/2015 | |
| KR | 10-2015-0039981 | 4/2015 | |
| KR | 2015-0039981 A | * 4/2015 | |

* cited by examiner

*Primary Examiner* — Robert D. Harlan
(74) *Attorney, Agent, or Firm* — Morgan, Lewis & Bockius LLP

(57) ABSTRACT

An anti-fouling (anti-pollution) coating material and a method of manufacturing a coating film are provided herein. The anti-fouling coating material has characteristics such as, but not limited to, an anti-fouling property, water repellency, oil repellency, and improved adhesion to a base material such as a lens. The anti-fouling coating material includes (a) a base material, (b) a low-reflectivity coating layer having a multilayer structure in which a silicon dioxide ($SiO_2$)-containing layer and a titanium dioxide ($TiO_2$)-containing layer are alternately stacked, (c) an anti-fouling coating layer that is formed on the low-reflectivity coating layer and includes an organic/inorganic composite material in which a silicon compound and a fluorine compound are linked to each other, and (d) an adhesion improving layer interposed between the base material and the low-reflectivity coating layer. The anti-fouling coating material is not readily detached to the surface of the base material such as a lens due to its superior adhesivity. Thus, the anti-fouling coating material can stably exert water repellency and oil repellency for a long time.

10 Claims, 5 Drawing Sheets

ANTI-FOULING SURFACE COATING MATERIALS

CROSS-REFERENCE TO RELATED APPLICATION

This application claims under 35 U.S.C. § 119(a) the benefit of Korean Patent Application No. 10-2016-0045723, filed on Apr. 14, 2016, the entire contents of which are incorporated herein by reference for all purposes.

BACKGROUND

Technical Field

The present disclosure relates to a coating technology for controlling surface energy. More specifically, the present invention relates to an anti-fouling (anti-pollution) coating material with improved adhesion to a base material such as a lens, anti-fouling property, and water repellency and oil repellency.

Background Art

Water repellent and oil repellent coatings are generally used to reduce fouling of optical articles, for example, by oily depositions.

As known, water repellency and oil repellent coatings are obtained by applying, to the surface of an anti-reflective coating, a compound for reducing the surface energy of optical articles.

Water repellent coating is a method of imparting low surface energy to an article at a contact angle of 90° or higher between the surface of the article and water.

The water repellent coating prevents water drops or the like from being formed on the surface of the article due to high contact angle. Accordingly, visibility of the article in rain can be improved.

The oil repellent coating prevents production of fine chemicals inside cars and fingerprinting caused by oily ingredients stained on the driver's hand and easily removes fouling materials from articles.

For this reason, water and oil repellent coatings are considered important in a variety of fields. Recently, with the development of advanced driver assistance systems (ADASs), water and oil repellent coatings are receiving much attention in the fields of back camera lenses or around-view monitoring of cars.

When water repellent coating is applied to a lens system of an ADAS, a problem in which visibility deteriorates due to raindrops, dust or muddy water upon raining can be solved.

Conventional water and/or oil repellent coatings are predominantly coating films produced using fluorine compound materials that have excellent chemical and/or thermal stabilities and water repellency.

Surface coating technologies for imparting low surface energy using various materials are researched in order to prevent surface fouling of a base material. Representative materials to realize low surface energy of the base material include fluorine compounds having a molecular structure in which a carbon-carbon main skeleton of organics is substituted by fluorine, instead of hydrogen. However, coating using fluorine compounds can overcome the problem of formation of water drops owing to water repellency, but have problems such as limited water repellency (lack of weatherability), lack of chemical resistance and fouling by soil, dust and oils.

Korean Patent Publication No. 10-2014-0122262 and Korean Patent Publication No. 10-2008-0008409 disclose a water repellent coating material including a silicon-based main skeleton having a fluorine substituent. The water repellent coating material exhibits excellent durability and functionality of an inorganic substance while maintaining chemical and thermal stabilities and water repellency of a fluorine compound.

These patent documents relate to water repellent coatings in the fields of fibers and displays, and weatherability of these coatings is too low to be used in a lens (or lens system). In addition, the inventions disclosed in these do not consider transmittance of the lens, adhesivity to a low-reflectivity layer, and the like.

There is an urgent need for the development of coatings that have excellent water repellency and oil repellency, as well as superior adhesion, abrasion resistance and weatherability, and that can be used in lenses for cars.

The above information disclosed in this Background section is only for enhancement of understanding of the background of the invention and therefore it may contain information that does not form the prior art that is already known in this country to a person of ordinary skill in the art.

PRIOR ART DOCUMENT

Patent Document

Korean Patent Publication No. 10-2014-0122262 and Korean Patent Publication No. 10-2008-0008409

SUMMARY OF THE DISCLOSURE

The present invention has been made in an effort to solve the above-described problems associated with the prior art.

One object of the present invention is to provide an anti-fouling coating material which exhibits superior weatherability and abrasion resistance, and superior water repellency and oil repellency.

Another object of the present invention is to provide an anti-fouling coating material with improved adhesion to a base material such as a lens.

The objects of the invention are limited to those discussed above. The objects of the invention will be understood more clearly and can be realized by means described in claims and combinations thereof.

The present invention may include the following configurations to realize the objects.

In one aspect, an anti-fouling coating material comprises a base material, a low-reflectivity coating layer having a multilayer structure in which a silicon dioxide ($SiO_2$)-containing layer and a titanium dioxide ($TiO_2$)-containing layer are alternately stacked, an anti-fouling coating layer being formed on the low-reflectivity coating layer and including an organic/inorganic composite material (e.g., an organic and/or inorganic composite material) in which a silicon compound and a fluorine compound are linked to each other, and an adhesion improving layer interposed between the base material and the low-reflectivity coating layer.

The low-reflectivity coating layer may include the silicon dioxide ($SiO_2$)-containing layer disposed on the surface of the low-reflectivity coating layer contacting the anti-fouling coating layer.

The silicon compound may be selected from a group consisting of octadecyltrimethoxy silane, octyltrimethoxy silane, methyltrimethoxy silane, ethyltrimethoxy silane, ethyltriethoxy silane, propyltrimethoxy silane, n-propyltriethoxy silane, isopropyltriethoxy silane, n-butyltrimethoxy silane, isobutyltrimethoxy silane, phenyltrimethoxy silane, N-(2-aminoethyl)-3-aminopropyltrimethoxy silane, 3-mercaptopropyltrimethoxy silane, 3-mercaptopropyltriethoxy silane, 3-aminopropyltriethoxy silane, 3-aminopropyltrimethoxy silane, 3-(meth)acryloxypropyltrimethoxy silane, 3-(meth)acryloxypropyltriethoxy silane, phenylaminopropyltrimethoxy silane, vinyltriethyloxy silane, vinyltrimethoxy silane, allyltrimethoxy silane and a combination thereof.

The fluorine compound may be selected from a group consisting of perfluoropolyether (PFPE), polytetrafluoroethylene (PTFE), fluorinated ethylene propylene (FEP), a perfluoroalkyl vinyl ether copolymer, and a combination thereof.

The anti-fouling coating layer may have a fluorine content of from about 10 to 50 wt % (e.g., about 10 wt %, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or about 50 wt %).

The anti-fouling coating layer may have a thickness of from about 5 to 200 nm (e.g., about 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195 or about 200 nm).

The anti-fouling coating layer may have a water contact angle of from about 100 to 150 degrees (e.g., about 100, 101, 102, 103, 104, 105, 106, 107, 108, 109, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or about 150 degrees).

The anti-fouling coating layer may have a hexadecane contact angle of from about 40 to 90 degrees (e.g., 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or about 90 degrees).

The adhesion improving layer may be a silica oxide film composed of silicon dioxide ($SiO_2$).

The adhesion improving layer may have a thickness of from about 10 to 100 nm (e.g., about 10, 15, 20, 25, 30, 35, 40, 45, 50, 55, 60, 65, 70, 75, 80, 85, 90, 95, or about 100 nm).

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

Figure 1:
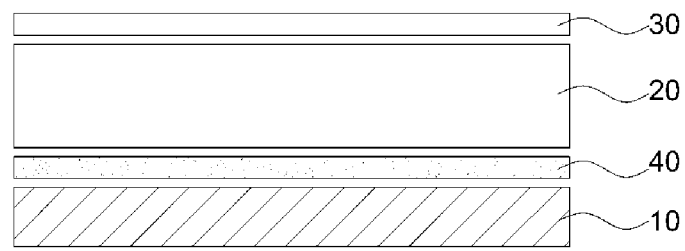
FIG. 1 is a sectional view illustrating an anti-fouling coating material according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. In the following description of the present invention, a detailed description of known functions and configurations incorporated herein will be omitted when it may obscure the subject matter of the present invention.

Hereinafter, preferred embodiments of the present invention will be described in detail.

The present invention provides an anti-fouling coating material which includes a base material 10, a low-reflectivity coating layer 20 having a multilayer structure in which a silicon dioxide ($SiO_2$)-containing layer and a titanium dioxide ($TiO_2$)-containing layer are alternately stacked, an anti-fouling coating layer 30 that is formed on the low-reflectivity coating layer 20 and includes an organic/inorganic composite material in which a silicon compound and a fluorine compound are linked to each other, and an adhesion improving layer 40 interposed between the base material 10 and the low-reflectivity coating layer 20.

The base material 10 may be a lens or substrate of optical devices used in, for example, display devices, glasses, cars, buildings and the like. Preferably, the base material 10 may be a lens used for advanced driver assistance systems (ADAS) of cars, but the present invention is not limited thereto.

The base material 10 may have a predetermined shape such as a curved or planar shape and is not limited to the shape shown in FIG. 1. In addition, the anti-fouling coating layer 30 may have the same shape as the surface of the base material 10 because it is coated on the base material 10.

The low-reflectivity coating layer 20 may have a multilayer structure including a plurality of layers respectively coated with oxides having different refractive indexes. Specifically, the low-reflectivity coating layer 20 may be formed by stacking three to ten coating layers (e.g., 3, 4, 5, 6, 7, 8, 9, or 10 coating layers) composed of different materials. Accordingly, the transmittance of light incident upon the lens can be increased.

The low-reflectivity coating layer 20 may have a thickness of from about 50 to 500 nm (e.g., about 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 nm). The reason for limiting the thickness to this range is that a silicon dioxide ($SiO_2$)-containing layer and a titanium dioxide-containing layer that have different refractive indexes can be stacked as the three to ten coating layers and the transmittance of light incident upon the lens can thus be increased.

The anti-fouling coating layer 30 may be formed of an organic/inorganic composite material composed of a silicon compound and a fluorine compound linked to each other.

Fluorine compounds had a problem of inapplicability to fields, such as motors and architecture, which are put under harsh conditions, due to low resistance to an organic solvent and lack of weatherability.

Accordingly, in the present invention, the organic/inorganic (e.g., organic and/or inorganic) composite material is formed by bonding the silicon compound to the fluorine compound and the anti-fouling coating layer 30 is formed using the organic/inorganic composite material.

The fluorine compound has a polar group and can thus form a composite material with the silicon compound.

In addition, the organic/inorganic hybrid material may have a silicon-based main skeleton having a fluorine group.

The silicon compound may be selected from a group consisting of octadecyltrimethoxy silane, octyltrimethoxy silane, methyltrimethoxy silane, ethyltrimethoxy silane, ethyltriethoxy silane, propyltrimethoxy silane, n-propyltriethoxy silane, isopropyltriethoxy silane, n-butyltrimethoxy silane, isobutyltrimethoxy silane, phenyltrimethoxy silane, N-(2-aminoethyl)-3-aminopropyltrimethoxy silane, 3-mercaptopropyltrimethoxy silane, 3-mercaptopropyltriethoxy silane, 3-aminopropyltriethoxy silane, 3-aminopropyltrimethoxy silane, 3-(meth)acryloxypropyltrimethoxy silane, 3-(meth)acryloxypropyltriethoxy silane, phenylaminopropyltrimethoxy silane, vinyltriethyloxy silane, vinyltrimethoxy silane, allyltrimethoxy silane, and a combination thereof.

The fluorine compound may be selected from a group consisting of perfluoropolyether (PFPE), polytetrafluoroethylene (PTFE), fluorinated ethylene propylene (FEP), a perfluoroalkyl vinyl ether copolymer, and a combination thereof.

The anti-fouling coating layer 30 may have excellent thermal, physical and/or chemical stability and ultra-water repellency derived from the fluorine compound, and excellent durability and weatherability derived from the silicon compound.

For this purpose, it is important to suitably mix the silicon compound and the fluorine compound. Preferably, the mixing is carried out such that the anti-fouling coating layer 30 has a fluorine content of from about 10 to 50 wt % (e.g., about 10 wt %, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or about 50 wt %).

The anti-fouling coating layer 30 may have a thickness of 5 to 200 nm (e.g., about 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195 or about 200 nm). When the thickness is less than 10 nm, weatherability cannot be improved, and when the thickness exceeds 200 nm, transmittance of the ultra-water repellency coating thin film may deteriorate.

The anti-fouling coating layer 30 includes a fluorine compound and thus has considerably poor adhesion to the base material 10 made of an organic polymer. Accordingly, the present invention solves this problem by forming the adhesion improving layer 40, functioning as a buffer, between the base material 10 and the anti-fouling coating layer 30.

The adhesion improving layer 40 is formed between the base material 10 and the anti-fouling layer to reduce stress between planes of the two layers. Accordingly, adhesion between the ultra-water repellent coating thin film and the base material 10 can be improved and abrasion resistance can be improved, for example, detachment of the ultra-water repellent coating thin film can be prevented.

In addition, the adhesion improving layer 40 is a compound that has affinity to both the base material 10 and the silicon compound of the anti-fouling coating layer 30 and may be a silica oxide film composed of silicon dioxide ($SiO_2$). In addition, the adhesion improving layer 40 may be, preferably, a silica oxide film including 3-(trimethoxysilyl) propyl methacrylate.

In addition, the adhesion improving layer 40 may have a thickness of from about 10 to 100 nm (e.g., about 10, 15, 20, 25, 30, 35, 40, 45, 50, 55, 60, 65, 70, 75, 80, 85, 90, 95, or about 100 nm). When the thickness is less than 10 nm, adhesivity cannot be improved, and when the thickness exceeds 100 nm, it may be difficult to form the adhesion improving layer 40 by dry deposition and transmittance of the ultra-water repellent coating thin film may deteriorate.

The anti-fouling coating material may be coated by a variety of methods, and is preferably formed under a dry atmosphere by vacuum deposition-type coating.

Hereinafter, preferred examples of the present invention will be descried with reference to the attached drawings. The following examples illustrate the invention described above in detail and are not intended to limit the scope of the present invention.

EXAMPLE 1

An adhesion improving layer 40 was formed on the surface of a base material (lens) 10, a low-reflectivity coating layer 20 was formed on the adhesion improving layer 40 and an anti-fouling coating layer 30 was formed on the low-reflectivity coating layer 20 to manufacture the anti-fouling coating material according to the present invention.

The adhesion improving layer 40 was formed using 3-(trimethoxysilyl)propyl methacrylate. In this case, the thickness of the adhesion improving layer 40 was adjusted to 10 nm or more.

The low-reflectivity coating layer 20 was formed by coating, by vacuum deposition, the lens with a silicon dioxide ($SiO_2$)-containing layer and a titanium dioxide-containing layer which have different refractive indexes.

The anti-fouling coating layer 30 was formed using an organic/inorganic composite material including PFPE and trimethoxy silane bonded to each other. In this case, the fluorine content and the thickness of the anti-fouling coating layer 30 were adjusted to 15 wt % and 20 nm or less, respectively. The anti-fouling coating layer 30 was formed using dry-type vacuum deposition.

Comparative Example 1

A lens not including all of the adhesion improving layer 40, the low-reflectivity coating layer 20 and the anti-fouling coating layer 30 was prepared.

Comparative Example 2

The anti-fouling coating material according to the present invention was produced in the same manner as in Example 1, except for the adhesion improving layer 40.

Test Example 1

Measurement of Contact Angle

The water and hexadecane contact angles of Example 1 and Comparative Example 1 were measured. Results are shown in Table 1.

TABLE 1

| Type | Sample name | Water contact angle | Hexadecane contact angle |
|---|---|---|---|
| Example 1 | Base material (lens) provided with adhesion improving layer, low-reflectivity coating layer and anti-fouling layer | 115.03° | 55° |
| Comparative Example 1 | Base material (lens) not provided with adhesion improving layer, low-reflectivity coating layer and anti-fouling layer | 72.9° | 25° |

Figure 2:
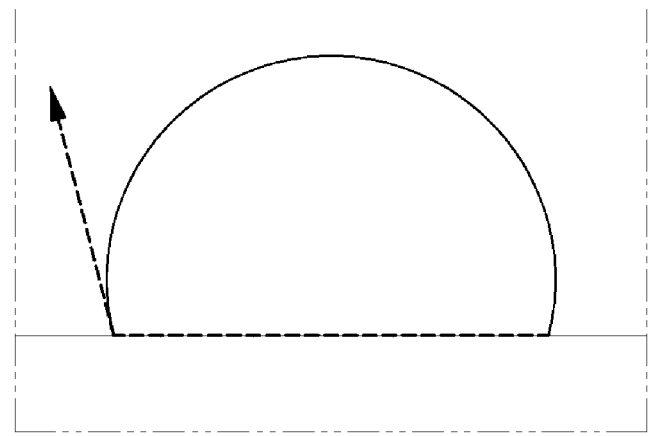
FIG. 2 shows a water contact angle of Example 1.
Figure 3:
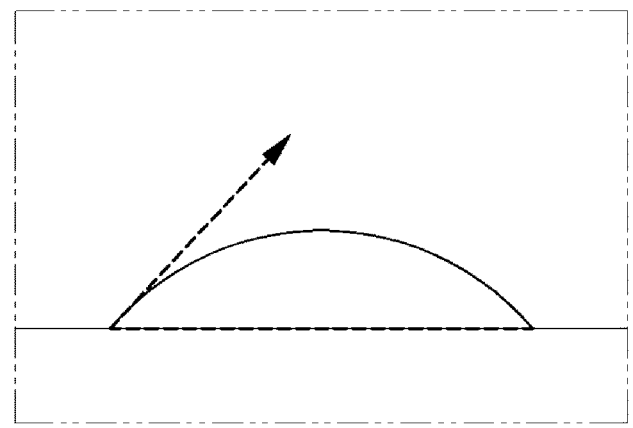
FIG. 3 shows a hexadecane contact angle of Example 1.

FIG. 2 shows water repellency of a lens (glass) substrate after formation of the anti-fouling coating material based on contact angles, and FIG. 3 shows oil repellency of a lens (glass) substrate after formation of the anti-fouling coating material based on contact angles.

The surface of the lens (glass) substrate formed using the anti-fouling coating material had a water contact angle of 115 to 120°, which means that the property of the surface was substantially changed to semi-ultra-water repellency, and the surface of the lens (glass) substrate had a hexadecane contact angle of 50 to 60°, which means that the coating material had both water repellency and oil repellency.

Test Example 2

Measurement of Transmittance

The transmittance of Example 1 and Comparative Example 1 was measured. Results are shown in Table 2.

TABLE 2

| Type | Sample name | Transmittance (550 nm) |
|---|---|---|
| Example 1 | Base material (lens) provided with adhesion improving layer, low-reflectivity coating layer and anti-fouling layer | 92.33 |
| Comparative Example 1 | Base material (lens) not provided with adhesion improving layer, low-reflectivity coating layer and anti-fouling layer | 91.67 |

Figure 4A:
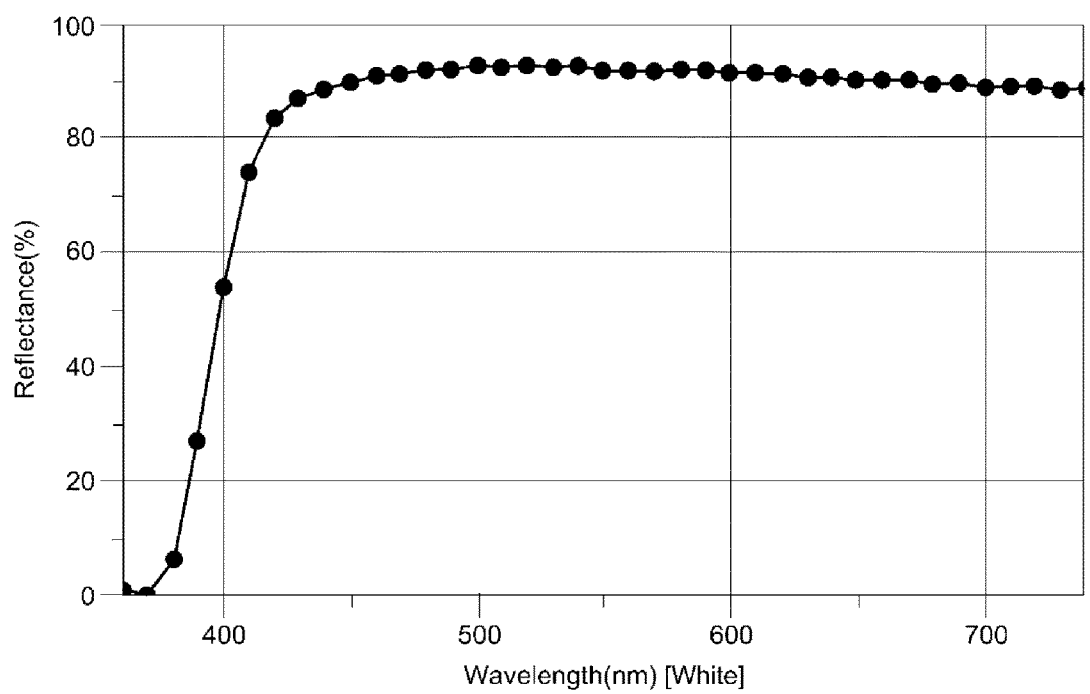
FIG. 4A is a graph showing transmittance of Comparative Example 1.
Figure 4B:
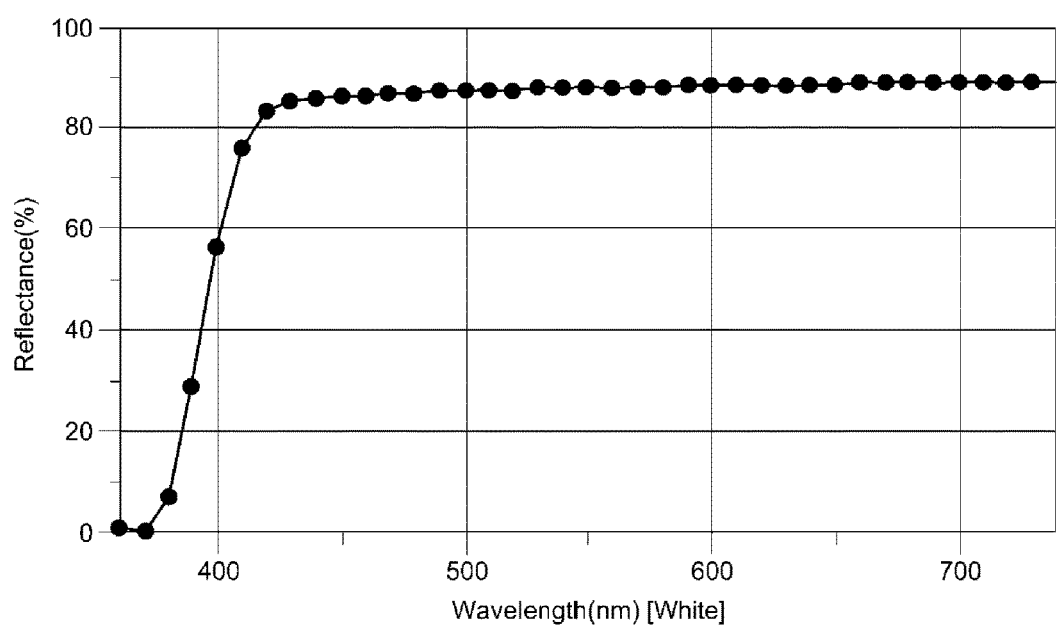
FIG. 4B is a graph showing transmittance of Example 1.

Table 2 shows variation in transmittance of a lens (glass) substrate before and after formation of the anti-fouling coating material according to the present invention and FIG. 4 is a graph showing evaluation of transmittance. The lens (glass) substrate had transmittance of 91.67% and 92.33%, before and after formation of the anti-fouling coating material, respectively. These values match transmittance of a general lens (glass) substrate, which means that the anti-fouling coating had no effect on optical properties of the substrate.

Test Example 3

Measurement of Adhesivity

Adhesivity of Example 1 and Comparative Example 2 was measured after immersion in 70° C. boiling water for 24 hours. Results are shown in FIG. 5.

Figure 5A:
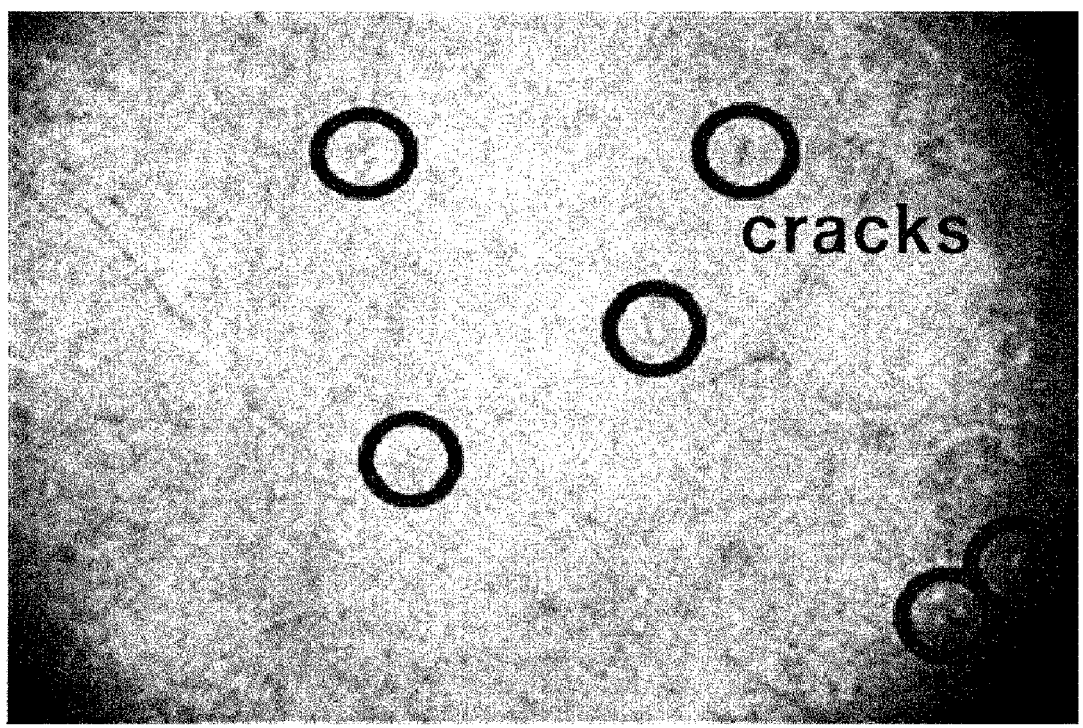
FIG. 5A is a surface image of Comparative Example 2 and FIG. 5B is a surface image of Example 1.
Figure 5B:
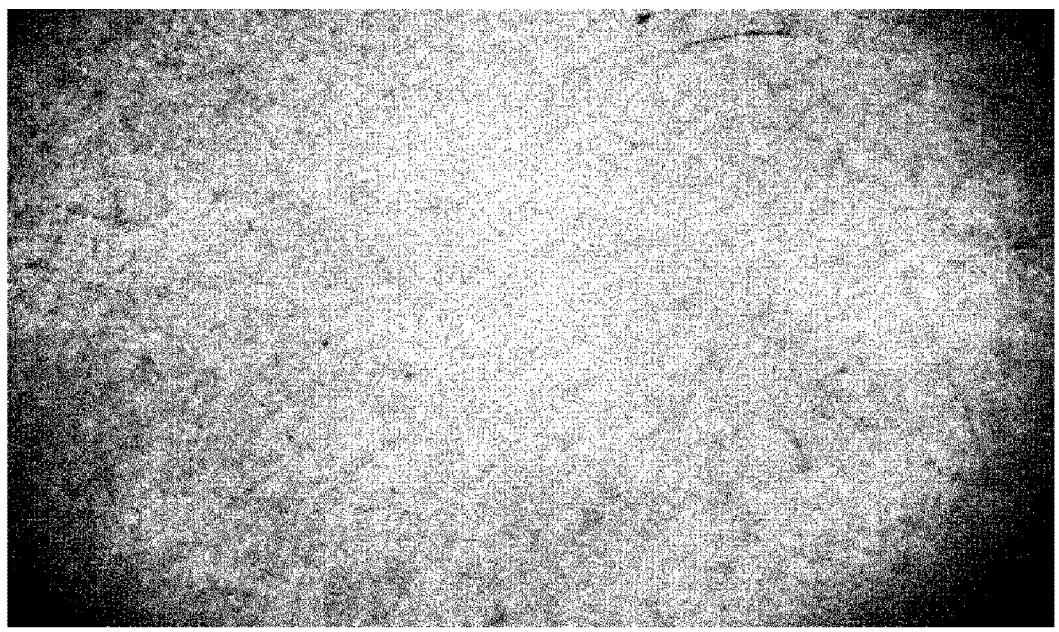

FIG. 5 shows that the surface of the material has no crack, which means the presence of adhesion after interposition of the adhesion improving layer. Comparative Example 2, in which a material not provided with the adhesion improving layer 40 is provided, and the surface of the material cracked after immersion in 70° C. boiling water for 24 hours.

Example 1 provided with the adhesion improving layer 40 had no crack, which means that the adhesion improving layer 40 improves adhesion.

The present invention includes the following configurations and thus exhibits the following effects.

The present invention is effective in improving weatherability and abrasion resistance by forming the anti-fouling coating layer with an organic/inorganic composite material including a silicon compound and a fluorine compound bonded to each other, and in providing a coating film with improved adhesivity by forming the surface of the low-reflectivity coating layer contacting the anti-fouling coating layer with a silicon dioxide ($SiO_2$)-containing layer.

The anti-fouling coating material according to the present invention exhibits excellent water repellency and oil repellency, thus preventing apparatus produced using the coating material from malfunctioning due to raindrops and fouling materials.

In addition, the anti-fouling coating material according to the present invention exhibits superior water repellency and oil repellency even under harsh conditions of cars, structures and the like, owing to excellent weatherability.

In addition, the anti-fouling coating material according to the present invention is not readily detached due to superior adhesivity to the surface of the base material such as a lens and can thus stably exert water repellency and oil repellency for a long time.

Other effects of the invention are not limited to those described above. It should be understood that effects of the present invention include all effects that can be inferred from the description provided above.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An anti-fouling coating material comprising:
    a base material;
    a reflectivity coating layer being formed on the base material and having a multilayer structure in which a silicon dioxide ($SiO_2$)-containing layer and a titanium dioxide ($TiO_2$)-containing layer are alternately stacked;
    an anti-fouling coating layer being formed on the reflectivity coating layer and including an organic/inorganic composite material in which a silicon compound and a fluorine compound are linked to each other; and
    an adhesion improving layer interposed between the base material and the reflectivity coating layer.

2. The anti-fouling coating material according to claim 1, wherein the reflectivity coating layer comprises the silicon dioxide ($SiO_2$)-containing layer disposed on a surface of the reflectivity coating layer contacting the anti-fouling coating layer.

3. The anti-fouling coating material according to claim 1, wherein the silicon compound is selected from a group consisting of octadecyltrimethoxy silane, octyltrimethoxy silane, methyltrimethoxy silane, ethyltrimethoxy silane, ethyltriethoxy silane, propyltrimethoxy silane, n-propyltriethoxy silane, isopropyltriethoxy silane, n-butyltrimethoxy silane, isobutyltrimethoxy silane, phenyltrimethoxy silane, N-(2-aminoethyl)-3-aminopropyltrimethoxy silane, 3-mercaptopropyltrimethoxy silane, 3-mercaptopropyltriethoxy silane, 3-aminopropyltriethoxy silane, 3-aminopropyltrimethoxy silane, 3-(meth)acryloxypropyltrimethoxy silane, 3-(meth)acryloxypropyltriethoxy silane, phenylaminopropyltrimethoxy silane, vinyltriethyloxy silane, vinyltrimethoxy silane, allyltrimethoxy silane and a combination thereof.

4. The anti-fouling coating material according to claim 1, wherein the fluorine compound is selected from a group consisting of perfluoropolyether (PFPE), polytetrafluoroethylene (PTFE), fluorinated ethylene propylene copolymer (FEP), a perfluoroalkyl vinyl ether copolymer, and a combination thereof.

5. The anti-fouling coating material according to claim 1, wherein the anti-fouling coating layer has a fluorine content of from about 10 to 50 wt %.

6. The anti-fouling coating material according to claim 1, wherein the anti-fouling coating layer has a thickness of from about 5 to 200 nm.

7. The anti-fouling coating material according to claim 1, wherein the anti-fouling coating layer has a water contact angle of from about 100 to 150 degrees.

8. The anti-fouling coating material according to claim 1, wherein the anti-fouling coating layer has a hexadecane contact angle of from about 40 to 90 degrees.

9. The anti-fouling coating material according to claim 1, wherein the adhesion improving layer is a silica oxide film composed of silicon dioxide ($SiO_2$).

10. The anti-fouling coating material according to claim 1, wherein the adhesion improving layer has a thickness of from about 10 to 100 nm.

* * * * *